US006756754B2

(12) United States Patent
Bent et al.

(10) Patent No.: US 6,756,754 B2
(45) Date of Patent: Jun. 29, 2004

(54) INTEGRATED ONE TOUCH UP AND DOWN WINDOWLIFT MOTOR WITH DIRECT SENSE FOR ANTI-PINCH

(75) Inventors: Robert Bent, Gainesville, GA (US); Martin F. Bass, Flowery Branch, GA (US)

(73) Assignee: Siemens VDO Automotive Inc., Mississauga (CA)

( * ) Notice: Subject to any disclaimer, the term of this patent is extended or adjusted under 35 U.S.C. 154(b) by 0 days.

(21) Appl. No.: 10/266,519

(22) Filed: Oct. 8, 2002

(65) Prior Publication Data

US 2004/0061462 A1 Apr. 1, 2004

Related U.S. Application Data

(60) Provisional application No. 60/415,200, filed on Oct. 1, 2002.

(51) Int. Cl.[7] ................................................ H02P 1/00

(52) U.S. Cl. ........................ 318/282; 318/280; 318/286; 318/466; 318/468; 318/266; 318/268; 49/26; 49/28

(58) Field of Search ................................ 318/280–282, 318/286, 266, 268, 466, 468, 273, 275; 49/26, 28

(56) References Cited

U.S. PATENT DOCUMENTS

| | | | | | |
|---|---|---|---|---|---|
| 4,001,661 | A | * | 1/1977 | Terabayashi | 318/264 |
| 4,562,387 | A | | 12/1985 | Lehnhoff | |
| 4,709,196 | A | * | 11/1987 | Mizuta | 318/282 |
| 4,773,183 | A | | 9/1988 | Okushima et al. | |
| 4,800,324 | A | | 1/1989 | Kuttner | |
| 4,857,812 | A | | 8/1989 | Mochizuki et al. | |
| 4,899,063 | A | | 2/1990 | Suck | |
| 4,900,994 | A | | 2/1990 | Mizuta | |
| 4,931,714 | A | | 6/1990 | Yamamoto | |
| 4,943,757 | A | | 7/1990 | Richter et al. | |
| 4,970,446 | A | * | 11/1990 | Yaguchi | 318/280 |
| 5,172,037 | A | | 12/1992 | Suck | |
| 5,194,769 | A | | 3/1993 | Ade et al. | |
| 5,245,258 | A | | 9/1993 | Becker et al. | |
| 5,351,439 | A | * | 10/1994 | Takeda et al. | 49/28 |
| 5,399,950 | A | | 3/1995 | Lu et al. | |
| 5,436,539 | A | * | 7/1995 | Wrenbeck et al. | 318/265 |
| 5,459,962 | A | | 10/1995 | Bonne et al. | |
| 5,528,093 | A | | 6/1996 | Adam et al. | |
| 5,539,290 | A | | 7/1996 | Lu et al. | |
| 5,559,375 | A | | 9/1996 | Jo et al. | |
| 5,592,060 | A | | 1/1997 | Racine et al. | |
| 5,610,484 | A | | 3/1997 | Georgin | |
| 5,701,063 | A | | 12/1997 | Cook et al. | |
| 5,731,675 | A | | 3/1998 | McCarthy | |
| 5,789,829 | A | | 8/1998 | Heesemann | |
| 5,801,501 | A | | 9/1998 | Redelberger | |
| 5,945,796 | A | | 8/1999 | Ohmori et al. | |
| 5,949,207 | A | | 9/1999 | Luebke et al. | |
| 5,955,854 | A | | 9/1999 | Zhang et al. | |
| 5,966,071 | A | | 10/1999 | Tsuge et al. | |

(List continued on next page.)

*Primary Examiner*—Rina Duda

(57) ABSTRACT

A windowlift control system 10 is provided for controlling movement of a window of a vehicle. The system 10 includes a DC bush motor 12 constructed and arranged to cause movement of the window up and down, and electronics 14 integral with the motor for controlling the motor to selectively move the window up and down. The electronics includes analog obstruction signal inputs 18, 20 for receiving analog obstruction signals from an obstruction sensor 16, associated with the window, that directly senses an obstruction in a travel path of the window. The electronics includes digital obstruction signal inputs 22, 24 for receiving digital obstruction signals from an obstruction sensor 16', associated with the window, that directly senses an obstruction in a travel path of the window. The electronics also includes switch decoding inputs 23, 25, 27 for signaling a manual or one-touch up mode of operation of the motor to move the window in an upward direction. The signal decoding inputs also allow for a manual or one touch down mode of operation of the motor to move the window downwardly.

18 Claims, 2 Drawing Sheets

U.S. PATENT DOCUMENTS

| | | | |
|---|---|---|---|
| 6,002,224 | A | 12/1999 | Stern |
| 6,028,408 | A | 2/2000 | Grass |
| 6,031,296 | A | 2/2000 | Takagi et al. |
| 6,043,620 | A | 3/2000 | Koestler |
| 6,051,899 | A | 4/2000 | Walther et al. |
| 6,060,852 | A | 5/2000 | Domel et al. |
| 6,078,160 | A | 6/2000 | Cilluffo |
| 6,154,149 | A | 11/2000 | Tyckowski et al. |
| 6,160,370 | A | 12/2000 | Ohnuma |
| 6,169,379 | B1 | 1/2001 | Zhang et al. |
| 6,223,467 | B1 | 5/2001 | Mahalek et al. |
| 6,291,957 | B1 | 9/2001 | Hopson et al. |
| 6,297,743 | B1 | 10/2001 | Heller |
| 6,326,758 | B1 | 12/2001 | Discenzo |
| 6,336,040 | B1 | 1/2002 | Asano et al. |
| 6,348,752 | B1 | 2/2002 | Erdman et al. |
| 6,373,005 | B1 | 4/2002 | Griesbach et al. |
| 6,389,752 | B1 | 5/2002 | Rosenau |
| 6,404,158 | B1 | 6/2002 | Boisvert et al. |

* cited by examiner

INTEGRATED ONE TOUCH UP AND DOWN WINDOWLIFT MOTOR WITH DIRECT SENSE FOR ANTI-PINCH

This application is based on U.S. Provisional Application No. 60/415,200 with the title "Integrated One Touch Up and Down Windowlift Motor with Versatile Direct Sense for Anti-Pinch" filed Oct. 1, 2002 and claims the benefit thereof or priority purposes.

FIELD OF THE INVENTION

The invention relates to DC brush motors and, more particularly, to DC brush motors with output gearing suitable for automotive power widows and having integral electronics that allow for one touch up and one touch down with anti-pinch protection during one touch up movement of the window.

BACKGROUND OF THE INVENTION

One touch up and one touch down window control systems with anti-pinch protection have been on the automotive market for some time. Conventionally, an obstruction (such as a finger or hand) in the path of the closing window can be sensed directly or indirectly. A direct sensor is typically in the form of a seal switch at the top of the window opening, or can be an optical transmitter/receiver that directly detects an obstruction in the window path. An indirect method of sensing an obstruction uses the effect of the obstruction on the motor speed (reduced speed) or motor current (increased current) to detect the obstruction. The direct sensing method typically results in lower pinch forces and some types of sensors (such as optical) result in no pinching.

Most windowlift platforms use separate electronics modules, or incorporate the one touch and anti-pinch windowlift functions in electronics modules that already contain other functions such as power seat controls, power mirror controls etc. The combining of functions may be an option on some high-end luxury vehicles, but speed signal outputs are required from the motors to these modules, and motor power leads from the modules to the motors, greatly increasing the complexity of the wiring harness.

Indirect obstruction sensing systems have the advantage of not requiring an external sensor, however, there are several disadvantages with this system. The software algorithm in an indirect system is quite sophisticated requiring a significant amount of memory, including non-volatile RAM, to implement. The additional memory, and higher clock speeds result in an expensive micro-controller. A ring magnet and hall sensors (for speed sensing) in the motor are also required. One of the biggest drawbacks for the automotive system designer, however, is the extensive calibration of the software algorithm to the platform's door/window design. This slows down the development of the complete door system, and re-calibration of the software algorithm is required if any changes are made to the window, window regulator, seals, etc. after the system is calibrated. Another disadvantage of the indirect system is that the electronics module must "learn" the individual door when it is installed to create an initial force table for future comparison. This "learning" process requires an additional assembly step in the OEM final assembly plant, along with special equipment.

Thus, there is a need to provide a novel DC brush motor windowlift control system with integrated electronics providing one touch up and down with anti-pinch protection that has significant cost and development advantages over existing systems.

SUMMARY OF THE INVENTION

An object of the invention is to fulfill the need referred to above. In accordance with the principles of the present invention, this objective is achieved by providing a windowlift control system for controlling movement of a window of a vehicle. The system includes a DC bush motor constructed and arranged to cause movement of the window up and down, and electronics integral with the motor for controlling the motor to selectively move the window up and down. The electronics includes obstruction signal inputs for receiving signals from an obstruction sensor, associated with the window, that directly senses an obstruction in a travel path of the window. The electronics accept digital or analog obstruction signal inputs. The electronics further includes switch decoding inputs for signaling manual or one touch up or down operation to move the window in an express up or express down mode or manual up or manual down mode. During the one-touch up mode of operation, the electronics are constructed and arranged to cause the motor to stop and reverse the window should an obstruction be detected. The electronics disable the express up mode if the obstruction signal inputs indicate the sensor is not ready or malfunctioning.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
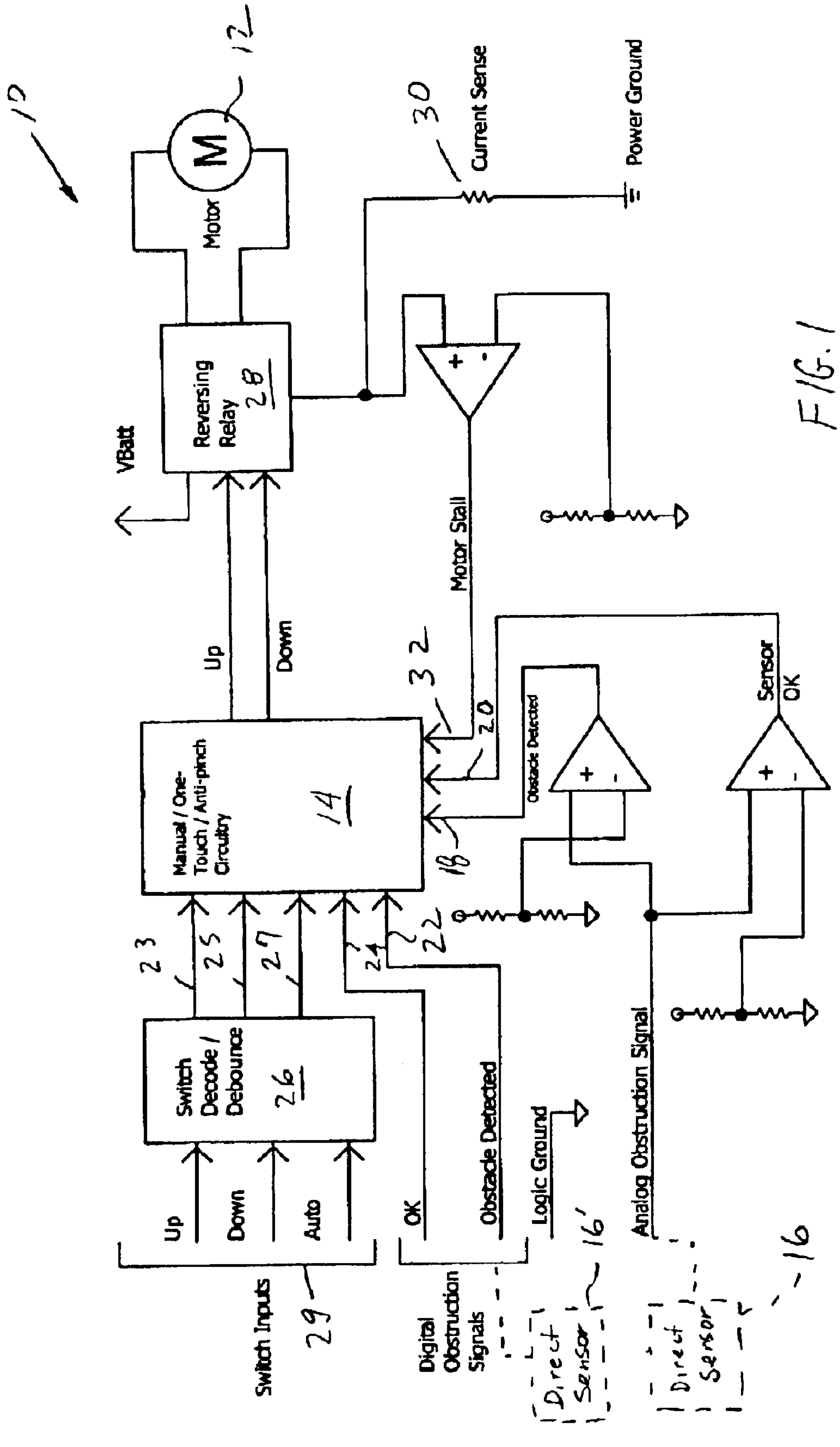
FIG. 1 is block diagram of a DC brush motor windowlift control system provided in accordance with the principles of the invention.
Figure 2:
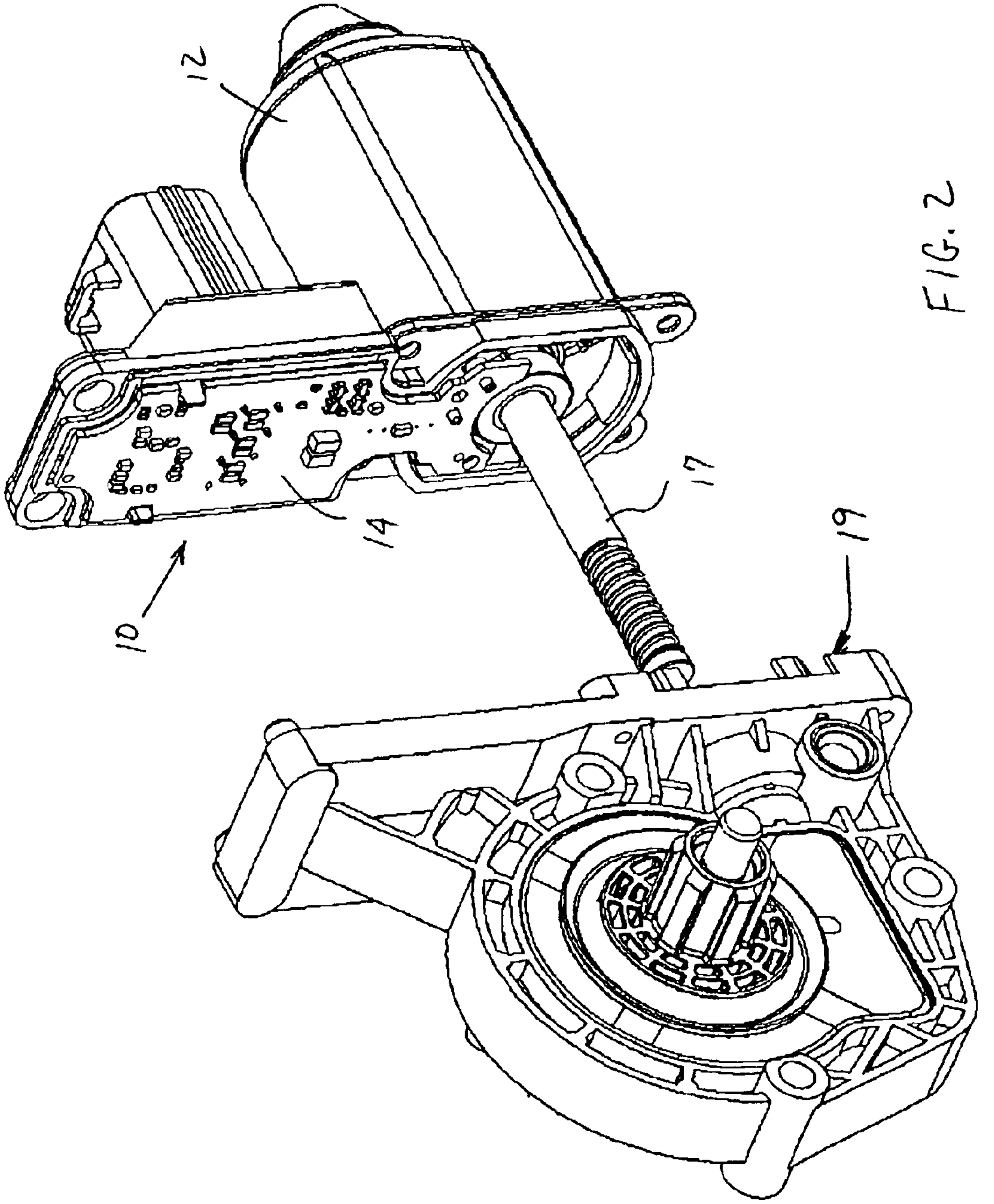
FIG. 2 is a perspective view of a DC brush motor windowlift control system having integrated electronics in accordance with the invention, show with the motor being operatively associated with a gear structure.

With reference to FIG. 1, a block diagram of an automotive windowlift control system is shown, generally indicated at 10, in accordance with the principles of the invention. As best shown in FIG. 2, the system 10 includes a permanent magnet, DC motor 12 with integrated electronics 14 that will allow one touch up, (OTU), (sometimes referred to as express up) and one touch down, (OTD), operation with anti-pinch protection using an external sensor 16 (FIG. 1) for obstruction detection. This electronics 14 accepts an electronic signal input from a sensor 16 that directly senses an object (such as a finger or hand) in the path of a closing window (not shown). The direct sensor 16 need not be part of the system 10, but the system 10 is configured to receive signals from the sensor 16 when the sensor 16 is coupled to the system 10. As shown in FIG. 2, a shaft 17 of motor 12 is operatively associated with gear structure, generally indicated at 19.

The sensor 16 can be in the form of a conventional seal switch at the top of the window opening such as, for example, of the type disclosed in U.S. Pat. No. 5,592,060, the contents of which is hereby incorporated into the present specification by reference. Thus, as shown in FIG. 1, the electronics 14 is constructed and arranged to receive analog input signals at 18 and 20, such as analog voltages or varying resistances, or other analog signals generated by the direct sensor 16. For example, a typical seal type sensor has two leads connected to contacts that run parallel with a slight air gap between them maintained by the shape of the rubber seal. A fixed electrical resistance is placed across the end of the contacts (the opposite end from the leads). When the seal is squeezed, the contacts inside the seal touch and the resistance between the leads drops. The electronics 14 monitors the direct sensor 16 and detects the drop in the resistance, flags a 'pinch' event and disables the one touch mode and/or stops and reverses the motor 12 if the window is moving upwardly. If the leads to the sensor 16 (or inside sensor) are broken the resistance will increase and the electronics will then disable the one touch up feature. A security feature may be implemented to allow the operator to 'override' the anti-pinch feature in case of a panic situation or ice on the window etc.

Alternatively, the sensor 16' can be an optical transmitter/receiver, such as for example, of the type disclosed in U.S. Pat. No. 6,404,158, the contents of which is hereby incorporated into the present specification by reference. Thus, as shown in FIG. 1, the electronics 14 is constructed and arranged to receive digital input signals at 22 and 24 generated by the direct sensor 16'. It is within the contemplation of the invention for the electronics 14 to accept any signal indicative of an obstruction in the window path.

With reference to the FIG. 1, the electronics 14 includes switch decoding inputs, 23, 25 and 27 associated with switch inputs 29 (e.g., up down and auto). The switch inputs 29 are received by switch decoding structure 26 that provides for manual (up or down) or One Touch Up and One Touch Down movement of a window to be controlled by the electronics and motor. As used herein the term "manual" is the command for the window to move in the direction requested as long as the switch is activated. The electronics 14 is versatile to allow for various switch implementations, such as double detent (manual, auto), or timed touch (short touch for auto, longer for manual). The switch decoding structure 26 allows for active high logic, or active low logic, or even simple switch closure detection.

The motor 12 is a standard permanent magnet, DC brush-type motor with output gearing suitable for automotive power windows. The motor 12 preferably has electronics built into the gear housing, which allows for the OTU and OTD operation with anti-pinch protection during one touch up (window closing) movement. The electronics 14 applies power of the proper polarity to the motor brushes through a reversing relay 28. The electronics 14 also monitors motor current via current sensing structure 30 to turn the motor 12 off at the end of window travel (top or bottom) via input 32.

With reference to FIG. 2, the electronics 14 can be a printed circuit board that is integrated with the motor 12. Such structure is shown and described; for example, in U.S. Pat. No. 5,528,093, the contents of which is hereby incorporated into the present specification by reference. Integrating the electronics 14 into the motor 12 offers many advantages for the automotive system designer. Wiring to a separate electronics module is eliminated.

Wiring to the operator switches can be small gage wire. Only the power and ground wires to the integrated motor need to be larger gage wire (for motor current). The need for a location to mount a separate electronics module is eliminated (and of course assembly steps to install it and the required harness). The operator switches do not need to switch motor current, allowing the use of lower cost switches.

The versatility of a motor with integrated electronics that can accept a variety of switch and sensor inputs gives the automotive system designer great flexibility. The same electronics could be integrated into motors of varying power output levels, allowing use on multiple platforms. Only minor program changes would be required. To properly program the integrated electronics, only a minimum amount of information is required; the motor running current and stall current, the signal outputs of the obstacle sensor and the switch logic. This allows for faster development.

The invention incorporates the following features in a windowlift motor with integrated electronic control:

1. Manual or One Touch UP and Down with versatile functionality, to allow customization of operation and features such as panic override for anti-pinch. Customization performed via programming.
2. Versatile direct sense signal handling is provided. Analog voltage, resistance, or digital signal inputs may be used from the external obstacle sensor for ant-pinch protection
3. Manual or One Touch UP and Down with versatile functionality, to allow customization of operation and features such as panic override for anti-pinch. Customization performed via programming.
4. Versatile switch input handling is provided. Active high or low logic, or timed switch activation may be used.

The above versatility will allow a single electronics module to be used over a large variety of vehicle platforms, changing only the a relatively simple program with only few parameters of the final window-lift system required to be defined in advance.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A windowlift control system for controlling movement of a window of a vehicle, the system comprising:

a DC brush motor constructed and arranged to cause movement of the window up and down, and electronics integral with the motor constructed and arranged to control the motor to selectively move the window up and down, the electronics including:

analog obstruction signal input constructed and arranged to receive an analog obstruction signal from an obstruction sensor, associated with the window, that directly senses an obstruction in a travel path of the window, digital obstruction signal input constructed and arranged to receive a digital obstruction signal from an obstruction sensor, associated with the window, that directly senses an obstruction in a travel path of the window, and switch decoding inputs constructed and arranged to signal manual mode of operation of the motor to move the window in a manual up or down mode, and a one-touch mode of operation of the motor to move the window in an express up or an express down mode, whereby during the one-touch up mode of operation, the electronics is constructed and arranged to cause the motor to stop and reverse in the express up mode when the digital obstruction signal input or the analog obstruction signal input indicates that an obstruction is in a path of the upwardly moving window.

2. The system of claim 1, wherein the digital obstruction signal input is constructed and arranged to receive a digital input signal from an optical sensor.

3. The system of claim 1, wherein the analog obstruction signal input is constructed and arranged to receive an analog input signal in the form of one of analog voltages and varying resistances.

4. The system of claim 1, wherein said motor is a permanent magnet motor.

5. The system of claim 1, further including switch decoding structure constructed and arranged to receive switch inputs indicating certain desired movements of the window, outputs of the switch decoding structure being received by the switch decoding inputs of the electronics.

6. The system of claim 1, further including a reversing relay that is constructed and arranged to receive signals from the electronics and apply power of a certain polarity to brushes of the motor.

7. The system of claim 1, further including a current sensing structure constructed and arranged to monitor motor current so that the electronics can turn the motor off at the end of window travel.

8. The system of claim 1, in combination with the obstruction sensor, an output of the obstruction sensor being received by the analog obstruction signal input.

9. The system of claim 1, in combination with the obstruction sensor, an output of the obstruction sensor being received by the digital obstruction signal input.

10. A windowlift control system for controlling movement of a window of a vehicle, the system comprising:

a DC brush motor means for causing movement of the window up and down, and electronics means integral with the motor means for controlling the motor to selectively move the window up and down, the electronics means including;

analog obstruction signal input means for receiving an analog obstruction signal from an obstruction sensor, associated with the window, that directly senses an obstruction in a travel path of the window, digital obstruction signal input means for receiving a digital obstruction signal from an obstruction sensor, associated with the window, that directly senses an obstruction in a travel path of the window, and switch decoding input means for signaling a manual mode of operation of the motor to move the window in a manual up or down mode, and a one-touch mode of operation of the motor to move the window in an express up or an express down mode, whereby during the one-touch up mode of operation, the electronics means is constructed and arranged to cause the motor means to stop and reverse the motor when the digital obstruction signal input means or the analog obstruction signal input means indicates that an obstruction is in a path of the upwardly moving window.

11. The system of claim 10, wherein the digital obstruction signal input means is constructed and arranged to receive digital input signals from an optical sensor.

12. The system of claim 10, wherein the analog obstruction signal input means is constructed and arranged to receive analog input signals in the form of one of analog voltages and varying resistances.

13. The system of claim 10, wherein said motor means is a permanent magnet motor.

14. The system of claim 10, further including switch decoding means for receiving switch inputs indicating certain desired movements of the window, outputs of the switch decoding means being received by the switch decoding input means of the electronics means.

15. The system of claim 10, further including a reversing relay means for receiving signals from the electronics means and applying power of a certain polarity to brushes of the motor means.

16. The system of claim 10, further including a current sensing means for monitoring motor current so that the electronics means can turn the motor means off at the end of window travel.

17. The system of claim 10, in combination with the obstruction sensor, outputs of the obstruction sensor being received by the analog obstruction signal input means.

18. The system of claim 10, in combination with the obstruction sensor, outputs of the obstruction sensor being received by the digital obstruction signal input means.

* * * * *